July 19, 1960 J. B. DECKER ET AL 2,945,259
ROLLER BRIQUETTING PRESS FOR THE BRIQUETTING
OF ORE, COAL OR SIMILAR MATERIALS
Filed Sept. 25, 1957 2 Sheets-Sheet 1
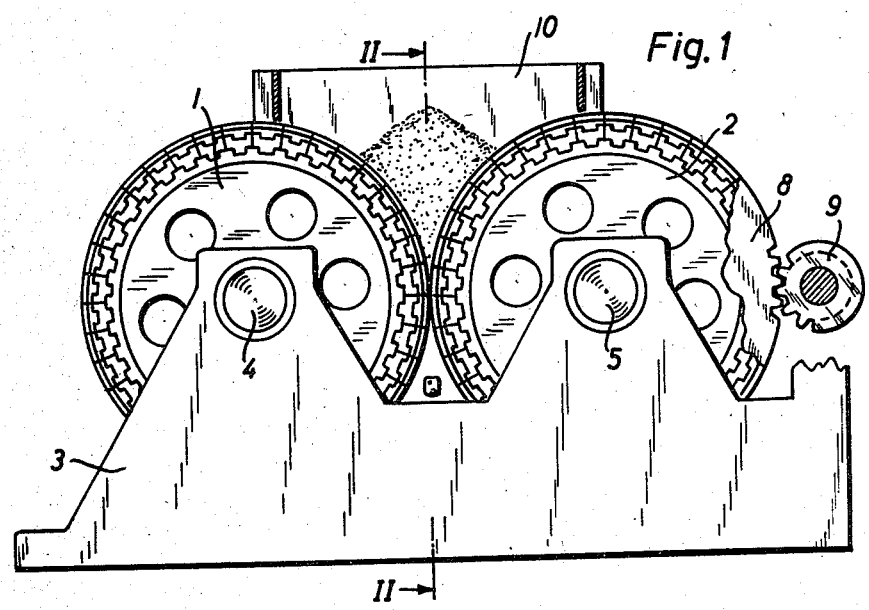
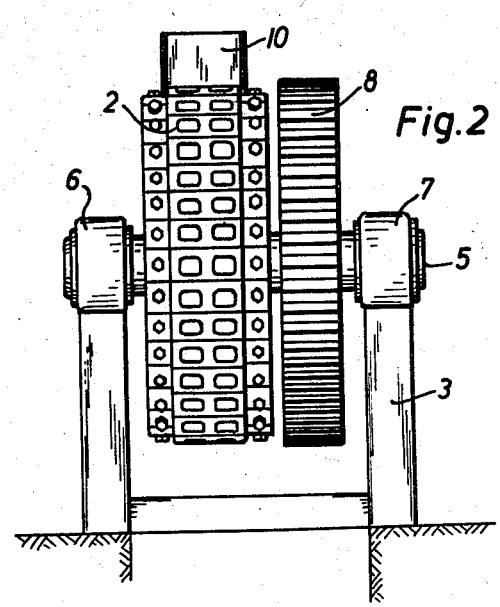
INVENTORS

2,945,259
ROLLER BRIQUETTING PRESS FOR THE BRIQUETTING OF ORE, COAL OR SIMILAR MATERIALS

Johannes Bernhard Decker, Koln-Rath, Heinz Meder, Koln-Dunnwald, and Karl Müller, Koln-Bruck, Germany, assignors to Klöckner-Hümboldt-Deutz Aktiengesellschaft, Koln-Deutz, Germany, a German corporation Filed Sept. 25, 1957, Ser. No. 686,212

4 Claims. (Cl. 18—21)

Our invention relates to a roller press for the briquetting of ore, coal or similar materials.

In a known roller briquetting press, the rollers each comprise a core onto which an undivided ring of steel is shrunk. The molds for forming the briquettes are machined into the ring, the machining being done by material-removing cutting tools. The core is firmly mounted or wedged on a rotating shaft.

The range of selection of the material for the steel jacket of such a roller-briquetting press is limited by the fact that the mold recesses must be formed in the material by means of chip-removing cutting tools. Consequently, the hardness of the jacket material must remain within narrow limits. In some cases, the jackets, subsequent to the very intricate machining operation, must be hardened. This is extremely time-consuming and difficult. Furthermore, the steel jackets are subjected to very considerable stress and wear, which necessitates that a material of great resistance to frictional wear be employed. When a jacket is worn, the roller, together with its shaft, is removed from the machine and the worn jacket is pulled off the core. This is a very intricate and time-consuming operation.

It is an object of our invention to minimize or eliminate these disadvantages.

To this end, and in accordance with our invention, each briquetting roller is composed of a roller wheel and of a ring or jacket formed of a number of segments, each ring segment being secured to the roller wheel laterally of the mold recesses serving for forming the briquettes. The arrangement of the ring segments is such that very slight gaps remain between them; and the segments are formed of a hard cast iron or cast steel highly resistant to frictional wear.

It is advantageous if the individual ring segments in such a roller-briquetting press consist of a cast material, because molds of accurate dimensions for the forming of the briquettes are thereby produced on the cylindrical surface of the ring segments. As a last step of the manufacture of the rollers, the surface of the ring segments is ground over. This method of manufacture considerably reduces the cost of the briquetting rollers. By virtue of the fact that extremely wear-resistant types of cast iron or cast steel can be used, the wear of the roller surface is greatly reduced. The subdivision of the roller ring into removably fastened ring segments offers the advantage that when replacing worn parts, only the individual worn ring segments need be exchanged while the roller remains mounted within the press.

According to another preferred feature of the invention, the ring segments, on their side facing the roller wheel, are inserted into the wheel by a dowel and groove connection, in order to prevent shifting of the ring segments in the peripheral direction. The individual segments are thus given a highly reliable abutting engagement on the roller wheel.

The foregoing and more specific objects, advantages and features of the invention will be apparent from the embodiment described in the following with reference to the drawings, on which—

Fig. 1 shows a somewhat simplified, or schematic, lateral view of the roller-briquetting press;

Fig. 2 is a cross section along the line II—II indicated in Fig. 1;

Figure 3:
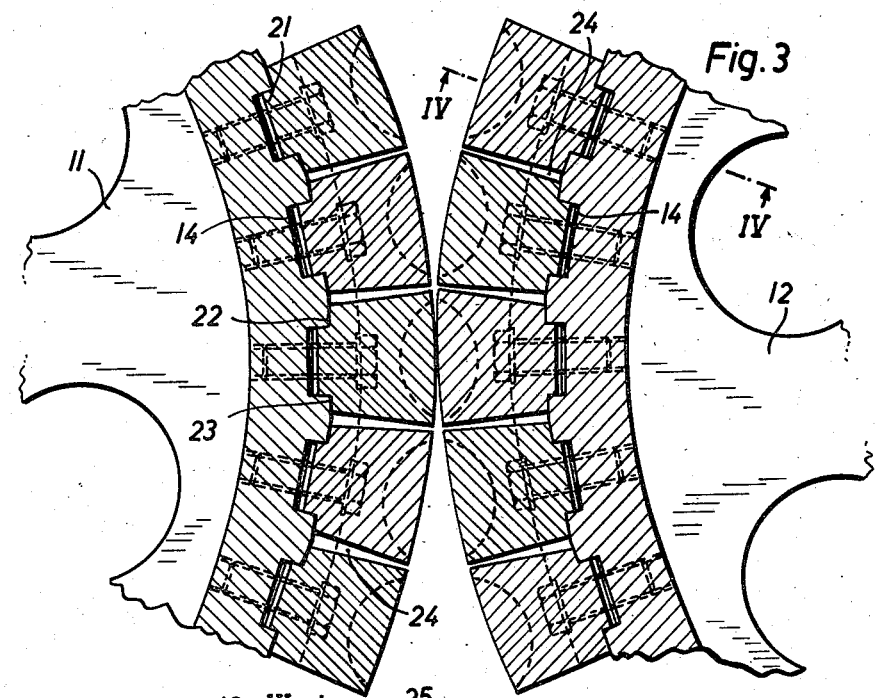
Fig. 3 is a detailed view of a portion of Fig. 1 on larger scale.

The briquetting press shown in Figs. 1 and 2 is provided with two briquetting rollers 1 and 2 firmly mounted on respective roller shafts 4 and 5. The roller shafts are journalled in bearings 6 and 7 of the machine frame structure 3. Mounted on each roller shaft beside the roller and slightly spaced therefrom is a spur gear 8. The diameters of the two spur gears are such that the gears mesh with each other to effect rotation of the two briquetting rollers in mutually opposed directions. The spur gear 8 on roller shaft 5 meshes with a pinion 9 which is likewise journalled on the machine frame structure 3 and is connected with the driving motor (not illustrated). Pinion 9 is schematically shown, only a number of its teeth being indicated. A material-supplying device 10 is located above the two rollers 1 and 2, this device being illustrated in Figs. 1 and 2 in schematic and simplified manner.

Figure 4:
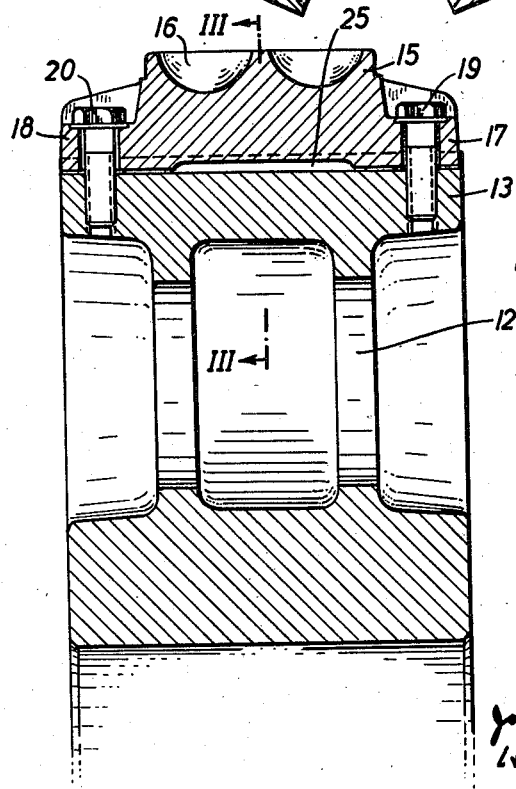
Fig. 4 is a cross section along the line IV—IV of Fig. 3.

As shown in Figs. 3 and 4, each roller is composed of a roller wheel 11 or 12 secured to the roller shaft 4 or 5 by means of keys or the like (not shown), and of a jacket ring composed of a number of segments 15, surrounding the roller wheel. The roller wheel consists of structural steel or cast steel of conventional constitution which can be machined with cutting tools. A number of slots or grooves 14 are milled into the outer ring 13 of the roller wheel in a manner customary for the manufacture of spur gears. The individual ring segments 15 possess a number of cup-shaped mold recesses 16 on their exterior peripheral surface for receiving the briquetting material. Each segment has projections 17 and 18 extending laterally of the mold recesses, which projections serve for fastening the segments on the outer ring 13. For this purpose, the projections 17, 18 are traversed by screw bolts 19 and 20 which permit loosening and removing the segments. This manner of fastening has the advantage that the pressure body proper of the segment, namely the middle portion which carries the mold recesses 16, is not interrupted by bores or the like, thus avoiding the danger that the segment may be damaged or destroyed at these locations, for instance by fatigue stresses.

Each segment has a projection 21 (Fig. 3) at its inner side facing the roller wheel. The projection 21 forms a dowel or plug which engages the groove 14 in such manner that a shifting of the segment in the peripheral direction is prevented. The pressure forces produced by the pressing operation are transmitted from the segment onto the roller wheel through the abutting surfaces 22 and 23. For this purpose, the inner face of each projection, or plug, 21 is spaced from the bottom of the groove 14 to permit transfer of pressure forces through the said abutting surfaces 22 and 23 formed on the roller wheel. The surfaces 22 and 23, and also the corresponding counter surfaces of the segments, are planar, that is flat. The roller wheel in its initial or unfinished state has a cylindrical shape. It is at first machined to the shape of a multi-sided prism having equal side faces, that is, so that its cross section is a regular polygon. Grooves 14 are then milled into the side faces. Consequently, the pair of wheel surfaces 22 and 23, on respective opposite sides of a groove 14, lie in a common plane. This simplifies the forming of the counter surfaces on the segments. The axially extending, lateral, opposed faces of projections 21 and grooves 14 are preferably parallel. Adjacent surfaces 22, 23 are angularly disposed, forming a wedge.

As apparent from Fig. 3, the individual segments are so shaped that a very slight wedge-shaped gap 24 remains between them. This has the advantage that the individual ring segments can be cast directly to measure and do not require subsequent machining at the sides. In other words, the gap is at least so large that it satisfies the tolerances involved in the casting operation. As shown on the drawing, the gap 24 is open at its outer end. During operation, these gaps fill themselves very rapidly with briquetting material.

The ring segments consist of a very hard and extremely wear-resistant cast iron or cast steel of the same properties, having a hardness of approximately 54 to 62 Rockwell, or 600 to 800 kg./mm.$^2$ Vickers. Such a material, due to its great hardness, is no longer machineable by cutting tools of steel. However, the manufacture by casting makes it possible to give the ring segments dimensions sufficiently accurate for the purpose of the invention. The segments are ground prior to being fastened. In this manner, they are given a particularly secure support. Thereafter, the segments are mounted onto and around the wheel body. A recess 25 (Fig. 4) is preferably provided at the bottom side of each segment.

The machining of the abutting surface is thus simplified, and a reliable abutment is promoted. After mounting the segments upon the wheel body, the ring formed by the totality of segments is accurately ground off at the outer surface to a cylindrical shape.

As mentioned above, the use of casting material has the advantage that the shape of the ring segments can be accurately produced by the casting operation itself.

In some cases, it is of advantage to fill the gaps between the individual ring segments by casting into these gaps a non-ferrous metal, for instance copper, which has about the same coefficient of thermal expansion as the casting material used for the ring segments. This prevents any briquetting material from entering between the ring segments. It is readily possible to make the gaps 24 of other than wedge shape. The gaps may be given parallel bordering walls.

It will be obvious to those skilled in the art, upon a study of this disclosure, that briquetting presses according to our invention can be modified in various respects and may be embodied in machinery other than particularly illustrated and described herein, without departing from the essence of our invention and within the scope of the claims annexed hereto.

We claim:

1. A press for briquetting ore, coal and similar materials, comprising two press rollers, the rollers turning about their axes in opposite directions, the roller surfaces moving downwardly in the region where their pressing surfaces approach, means to supply material to be briquetted to the pressing surfaces, each press roller comprising a roller-wheel structure and a jacket ring forming said pressing surface, the jacket ring comprising a plurality of segments peripherally spaced from each other about the wheel structure, each of said segments and its corresponding roller forming tongue and groove means at their mutually abutting surfaces for insertion and peripheral retention of said segments, the mutually opposed lateral surfaces of peripherally adjacent segments being spaced from each other sufficiently for as-cast tolerances in the maximum peripheral width of each segment and defining separation gaps between said segments so as to provide no mutual peripheral support between peripherally adjacent segments, said opposed lateral surfaces of adjacent spaced segments being slanted to shape each of said gaps as a wedge-shaped recess narrowing outwardly, the segments being made of hard, wear-resistant material taken from the group consisting of cast iron and cast steel, the segments having briquette-forming depressions in their respective outer peripheral surfaces, each segment being provided with lateral projections, means for fastening the lateral projections, and thereby the segment, to the wheel structure, said fastening means being lateral to the part of the segment having any briquette-forming depression, the wheel structure having outermost peripheral surfaces and axially extending recesses therebetween narrower in the peripheral direction than the corresponding width of the segment on the side of the latter facing the wheel structure, an inner surface of each of said segments being axially and coextensively contiguous with an outermost peripheral surface of said wheel structure, the segment being radially removable from said wheel structure and having on said inner surface thereof facing the wheel structure a projecting portion which is received in said latter recess.

2. A roller briquetting press for the briquetting of ore, coal and similar materials, comprising two cooperating press rollers mounted for rotation in opposite rotational directions, a plurality of mold segments removably bolted to the outer periphery of each of said rollers, said segments each being of a hard, highly wear-resistant material and having mold cavities in the outer face thereof for forming the briquettes, an inner face of each of said segments being axially and coextensively contiguous with an outermost peripheral surface of one of said rollers, the contiguous surfaces forming mating tongue and groove means between each segment and the outer periphery of a respective roller for preventing peripheral movement of the respective segment and for radial removal of the latter, the mutually opposed lateral surfaces of peripherally adjacent segments being spaced from each other sufficiently for as-cast tolerances in the maximum peripheral width of each segment and defining separation gaps between said segments so as to provide no mutual peripheral support between peripherally adjacent segments.

3. A roller briquetting press according to claim 2, said mutually facing sides of adjacent ones of said segments being formed so as to be mutually non-contiguous and at a greater distance apart at their centermost portion than at the outer peripheral portion thereof, whereby said interspaces become wider toward the roller axis, and whereby material from that being briquetted can become wedged within said interspaces to form a hard peripheral surface between said adjacent segments.

4. A roller briquetting press according to claim 2, and including segment spacing means of non-ferrous material filling said radial interspaces between said segments, said non-ferrous material having approximately the same thermal coefficient of expansion as said wear-resistant material of said segments.

References Cited in the file of this patent

UNITED STATES PATENTS

| | | |
|---|---|---|
| 538,475 | Albrecht | Apr. 30, 1895 |
| 915,332 | Burnes | Mar. 16, 1909 |
| 1,164,822 | Komarek | Dec. 21, 1915 |
| 1,357,141 | Bibb | Oct. 26, 1920 |
| 2,455,980 | Dallas et al. | Dec. 14, 1948 |

FOREIGN PATENTS

| | | |
|---|---|---|
| 567,069 | Great Britain | Jan. 26, 1945 |

OTHER REFERENCES

Halliday: "Moulds for Plastics," 1948, Temple Press Ltd., Bowling Green Lane, London, E. C., pages 224–225. (Copy in Scientific Library.)